United States Patent

[11] 3,571,579

| [72] | Inventors | David John Whitehouse<br>Melton Mowbray;<br>John Denzil Barr, Oadby; Richard Edmund Reason, Market Harborough; Thomas Charles Reeve, London; Robert Claude Spragg, Leicester; Arthur Tisso Starr, New Barnet; Peter Frederic Thomas Cryer Stillwell, Aldershot, England |
|---|---|---|
| [21] | Appl. No. | 723,978 |
| [22] | Filed | Apr. 25, 1968 |
| [45] | Patented | Mar. 23, 1971 |
| [73] | Assignee | The Rank Organisation Limited<br>London, England |
| [32] | Priority | Jan. 18, 1965, Aug. 26, 1965 |
| [33] | | Great Britain |
| [31] | | 2166/65 and 33673/65<br>Continuation-in-part of application Ser. No. 521,286, Jan. 18, 1966, now abandoned. |

[54] ASSESSING OF SURFACE PROFILES
31 Claims, 18 Drawing Figs.

[52] U.S. Cl. .................................................. 235/151.3,
73/105, 235/181, 250/208, 333/29, 333/70, 350/161
[51] Int. Cl. ................................................. G01b 7/34,
G06g 7/19
[50] Field of Search ........................................ 235/181,
151.13, 151.3, .31; 73/105; 333/19, 29, 70

[56] References Cited
UNITED STATES PATENTS

| 3,199,106 | 8/1965 | Karr .............................. | 235/181X |
| 3,242,321 | 3/1966 | Chope ........................... | 235/151.13 |
| 3,270,188 | 8/1966 | Ares .............................. | 235/181 |
| 3,315,171 | 4/1967 | Becker .......................... | 235/181X |
| 3,353,011 | 11/1967 | Cherry et al. .................. | 235/181 |
| 3,358,149 | 12/1967 | Preikschat .................... | 235/181X |
| 3,432,648 | 3/1969 | Silverman...................... | 235/181 |
| 3,439,155 | 4/1969 | Alexander...................... | 235/181 |
| 3,459,930 | 8/1969 | Lerwill et al. ................. | 235/181 |
| 3,486,016 | 12/1969 | Faiss.............................. | 235/181 |

*Primary Examiner*—Malcolm A. Morrison
*Assistant Examiner*—Felix D. Gruber
*Attorney*—Griffin and Branigan & Kindness ABSTRACT: This invention relates to an instrument for testing the surface profile of a workpiece for irregularities. A conventional stylus arrangement is used to derive signals representative of the irregularities of the workpiece profile relative to a convenient datum, and these signals are stored, for example on a film strip or a magnetic tape. Signals are then extracted from the store by operating on each successive value of the stored signal with a weighting function which is nominally symmetrical about an instantaneous midordinate. The resulting signal represents, for each successive part of the profile under test, the convolution of the respective part of the first signal with the said weighting function, and is arranged to represent a useful means line from which the surface irregularities indicated by the first signal may be assessed.

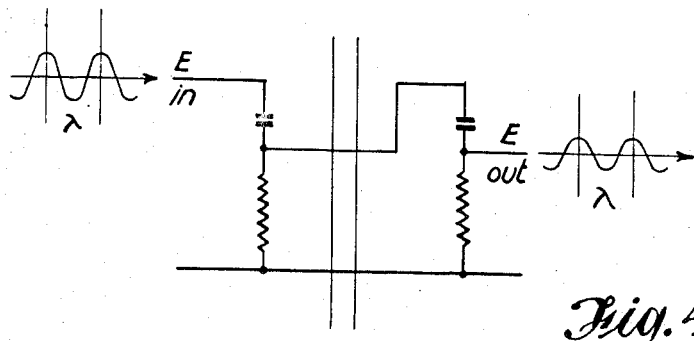
Fig. 4.
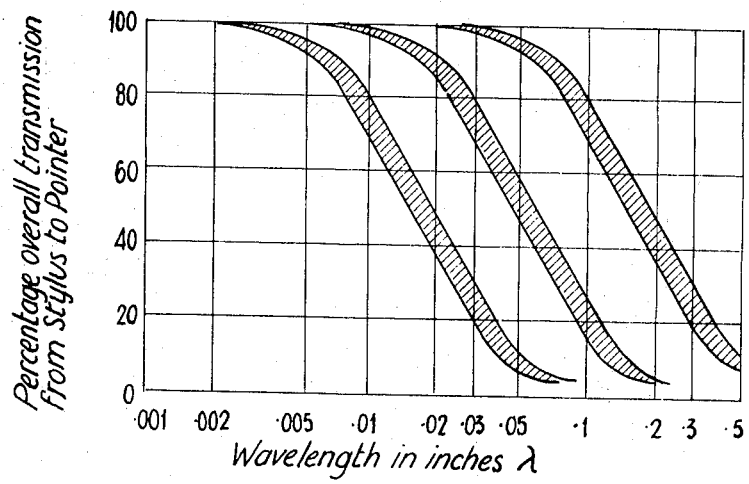
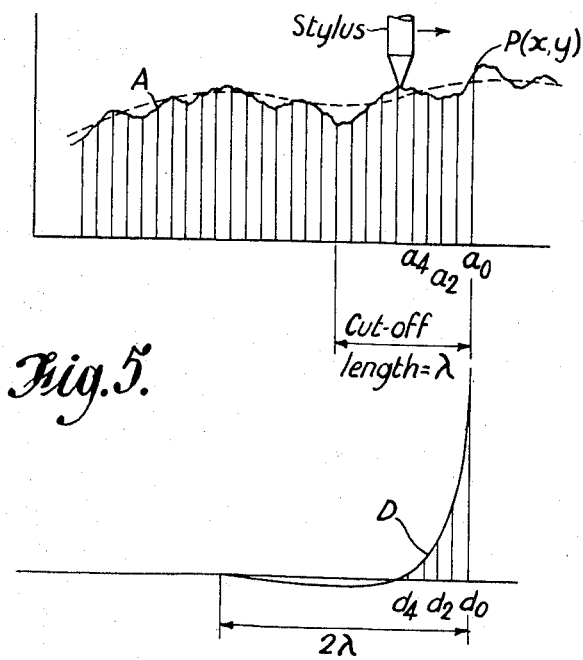
Fig. 5.

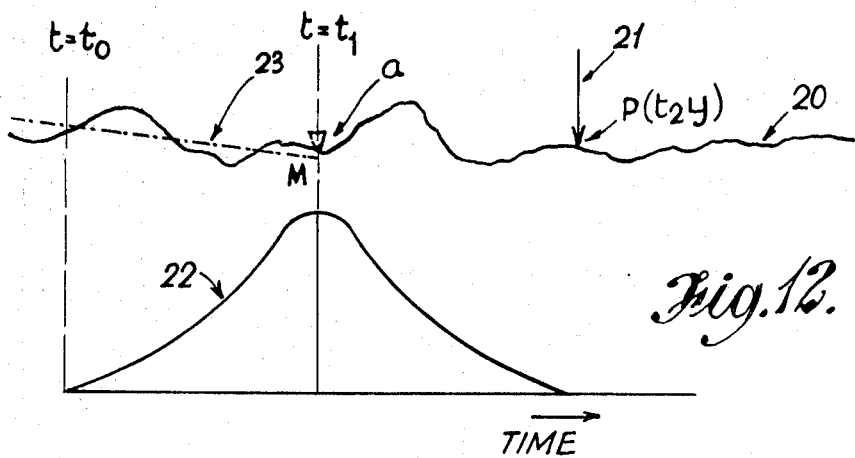
Fig. 12.
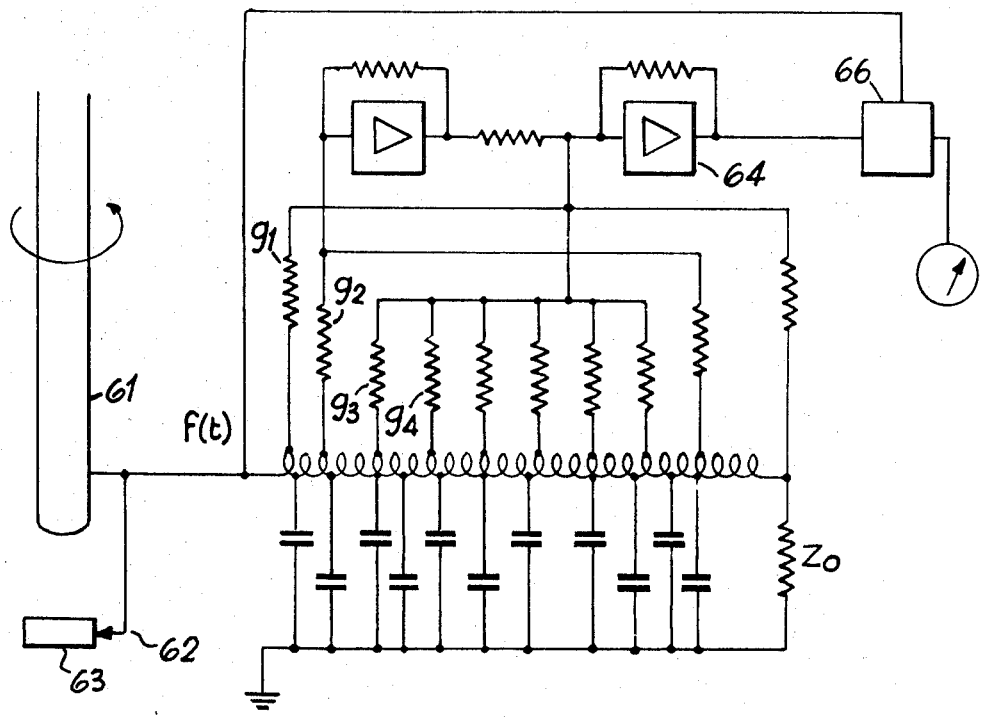
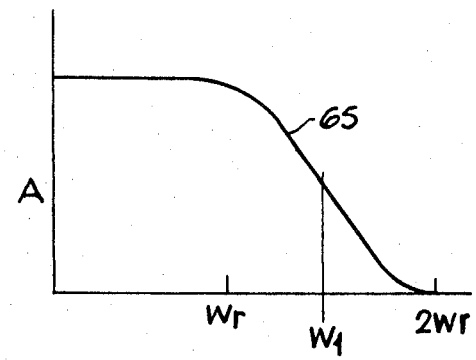
Fig. 16.

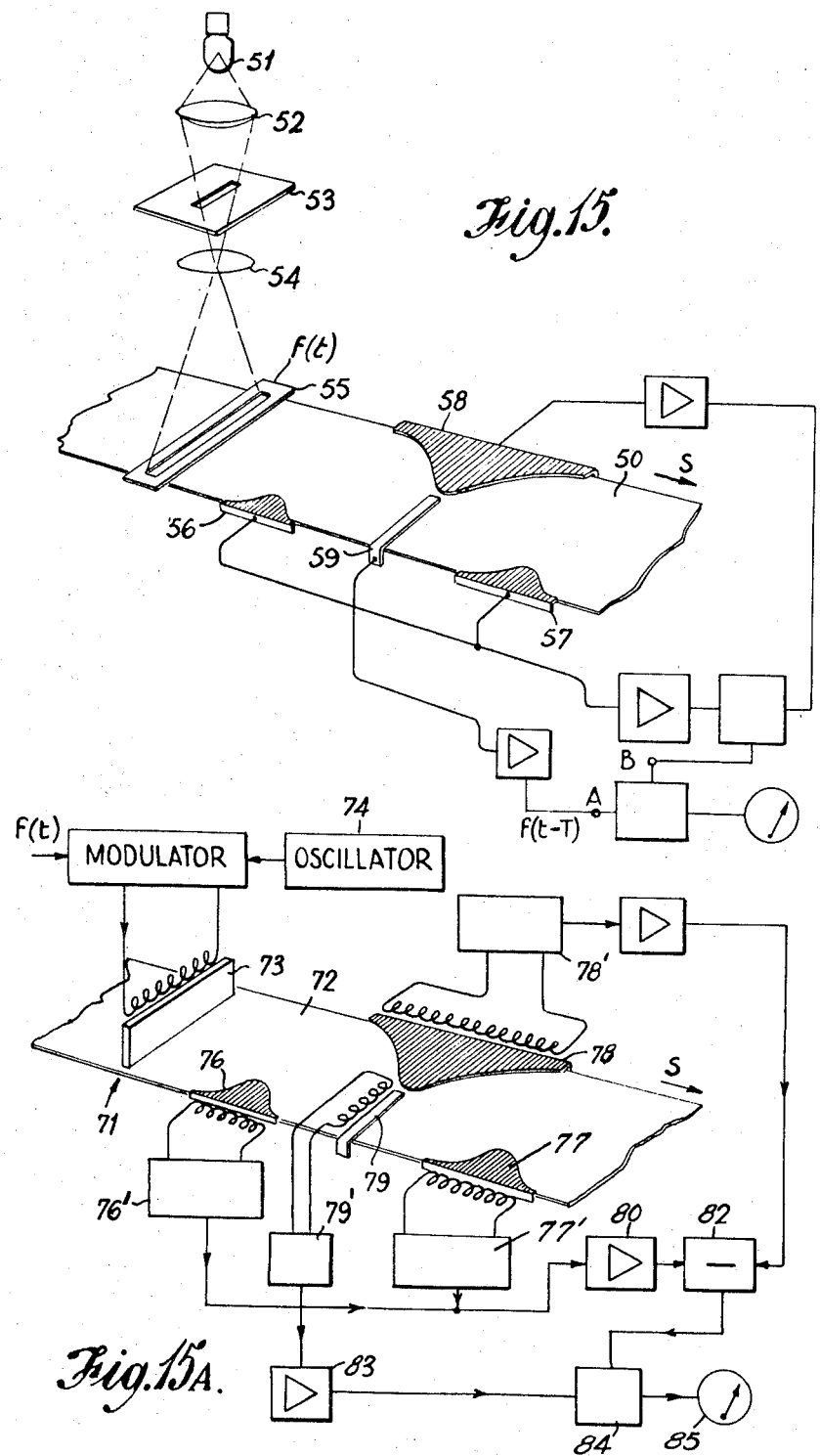

ASSESSING OF SURFACE PROFILES

This invention relates to the assessing of surface profiles, and is concerned particularly but not exclusively with instruments for assessing the quality and characteristics of the surface of a workpiece. This application is a continuation-in-part of application Ser. No. 521,286, filed Jan. 18, 1966, now abandoned.

An object of the invention is to provide an instrument for the assessment of surface profiles which is capable of providing a signal representing a mean profile from which surface profile irregularities can be measured.

According to the invention there is provided an instrument for the assessment of profiles, especially the profiles of surface irregularities, the instrument comprising in combination means for producing a first signal proportional to the amplitude of the irregularities of said profile relative to a convenient datum, signal means defining a weighting function for any given instantaneous value of the first signal, which weighting function is nominally symmetrical about said instantaneous value, storage means for storing said first signal, and means responsive to the storage means and to said weighting function means to derive from said stored first signal a second signal representing at any instant the value of the convolution integral of a predetermined portion of the stored first signal with said weighting function, said second signal representing a mean profile from which the first signal is assessed.

The weighting function may comprise wholly positive or positive and negative portions, while optical or electrical storage means may be employed. The gauge signal from the transducer may be recorded as a profile on photosensitive material, and the means for deriving said signal representative of the convolution integral may include a light source illuminating one or more areas of the material bearing the stored gauge signal, and photoelectric means responsive to light transmitted through or reflected from said area or areas.

Alternatively the gauge signal may be stored on a magnetic medium, and the signal representing the convolution integral may be derived from one or a plurality of reading heads in juxtaposition to the magnetic medium.

Preferably means are provided for effecting relative movement between the magnetic medium and one, or each, of the plurality of reading heads at a predetermined rate. The effective sensitivity of the one or more each reading heads may have different values at different points along the length of the head in the direction of said relative movement in accordance with the prescribed weighting function.

Embodiments of instruments according to the present invention will now be particularly described hereinafter by way of example with reference to the accompanying drawings, in which:

FIG. 4 is a simplified circuit diagram of an electric wave filter and its transmission characteristics.

FIG. 5 is an illustration of the mathematical principles underlying the construction of a mean line using a standard electric wave filter.

FIG. 12 is a diagram illustrating the operation of the embodiment of FIG. 11.

FIG. 15 is a diagrammatic representation of a further embodiment.

FIG. 15A is a diagrammatic representation of a yet further embodiment.

FIG. 16 is a diagrammatic representation of a further electrical embodiment.

Figure 1:
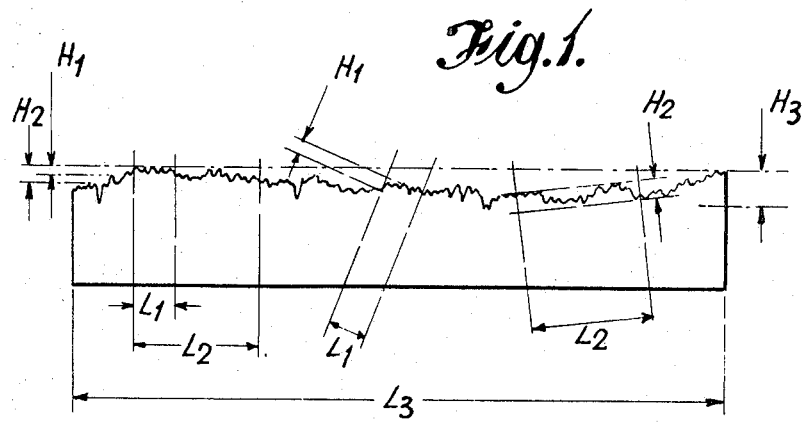
FIG. 1 is a representation of a greatly magnified profile of a cross section of a workpiece, showing three classes of surface irregularity.

Surface irregularities can often be appraised in three broad groups, commonly referred to as roughness, waviness and errors of form. In the case of machined surfaces, these groups are derived respectively from the material cutting or abrasive action of the process of manufacture, from defects such as vibration between tool and workpiece and from imperfect guiding of the tool along its intended path. They are generally distinguished by differences in the dominant crest spacings of the irregularities of which they are comprised, as illustrated in FIG. 1.

It is generally useful to assess these groups separately, and to this end it is necessary as a preliminary to measurement, to isolate the desired group and also to provide a reference line having certain properties, and from which measurement can be made.

Figure 2:
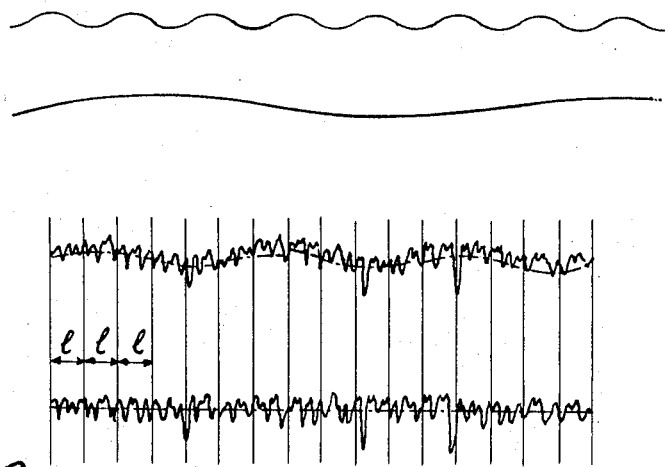
FIG. 2 is an illustration of the graphical method of isolating roughness from the other classes of surface irregularity, while the lower curve is the upper curve redrawn with the the individual mean lines in alignment.
Figure 3:
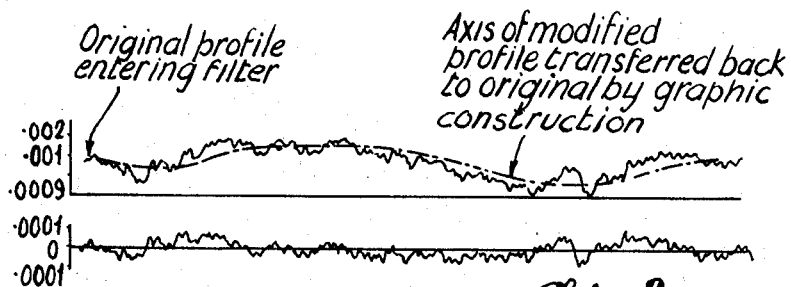
FIG. 3 is an illustration of the action of an electric wave filter, showing the original profile in the upper portion, the modified profile emerging from the filter drawn about on straight axes representing zero current, and the axes of the modified profile transferred back to the original profile.

Two widely known and standardized methods of separating roughness from the remaining groups are (1) to divide a greatly magnified profile of the surface into short sections, graphically, as shown in FIG. 2, within which the effect of the waviness will not be apparent, and (2) to pass an alternating electric current representing the original profile through an electric wave filter nominally transmitting the higher frequencies representing the roughness and rejecting the lower frequencies of waviness, as shown in FIG. 3. The alternating current is generally derived from a stylus type of pickup which is traversed across the surface.

In order to carry out the actual measurement, a reference line is then required. For the graphical method, the reference line is obtained by drawing through the profile, within each short section, a reference line, also called a mean line, which divides equally the areas enclosed by the profile lying above and below it. In the case of the electrical wave filter, the mean line passes through those points on the output profile (known as the modified profile) for which the current is instantaneously zero, and is found by the natural action of the filter on the input profile.

The now standardized electric wave filter comprises two condenser-resistance stages of equal time constant so connected in cascade that the second does not load the first, and having the transmission characteristic shown in FIG. 4.

A widely used measure of roughness is the average departure of the roughness profile from its mean line, known as the centerline average or CLA value. It is found empirically that if the long wavelength cutoff of the filter is made equal to the length of the geometrical sections in FIG. 2, the CLA values determined by the two methods are substantially equal. Wavelength (or crest spacing) $\lambda$ on the surface is converted into frequency $f$ per unit of time, to which the filter is fundamentally responsive, by the speed of traverse $s$; thus $f = s/\lambda$.

In addition to the CLA value, interest is sometimes taken in other measures, for example peak heights, bearing fractions, slopes of flanks, to name a few.

The foregoing mean lines, especially the electrical mean line, have proved generally acceptable for industrial measurement and are likely to continue to do so because they lead to simple instrumentation.

Nevertheless, it has long been realized that they have certain undesirable features which it is the purpose of the present invention to overcome. These features become more apparent when more elaborate or refined measurement is attempted.

For example, the successive mean lines as shown in FIG. 2 frequently do not join up. The resulting discontinuities are mechanically unrealistic, and interfere with peak measurements. The electric wave filter avoids discontinuities, but tends to introduce some degree of phase shift within the pass band, and this phase shift can produce undesirable distortion of the waveform to be measured, even though such waveform comes nominally within the pass band of the filter.

The electric wave filter establishes the position of the mean line, at any instant, by operating on the profile that has passed through it in a way that takes less and less account of the amplitude of the profile ordinates as the recede in time, according to the memory of the filter as determined by the time-constant of its CR networks. It has recently been shown that the action of the standard two-stage CR filter can be computed by operating on the original profile, at successive points along it, with a weighting function such as that shown in FIG. 5 which conforms to the impulse response of the filter. The ordinate of the mean line at any point is obtained by multiplying the ordinates of the profile by those of the weighting function, summing the products, and multiplying by a constant. The operation of the weighting function on the profile may be represented as a convolution integral, as hereinafter shown.

It is found that apart from undesired distortion of the modified profile lying within the pass band of the filters, its mean line may not be straight even though the crests and valleys of a recurrent waveform are each coplanar. This again is mechanically unrealistic, even though the overall numerical evaluation of the CLA may be correct.

A desirable type of wave filter can be defined as one that is free from phase shift, that has a transmission characteristic which is flat up to the cutoff and then attenuates abruptly or gradually as may be desired, and that operates with respect to a mean line which (up to the cutoff) is equidistant from the crests of a repetitive waveform. Further, the filter should require for its operation a minimum length of surface over and above the length to be evaluated.

According to the present invention there is provided an instrument for assessing profiles, especially the profiles of surface irregularities, comprising a transducer for producing a gauge signal proportional to the height of the irregularities of said surface, storage means for storing said gauge signal, and means for deriving from said stored gauge signal a signal representing the convolution integral of a predetermined portion of said gauge signal with a weighting function which is nominally symmetrical about an instantaneous midordinate.

Figure 6:
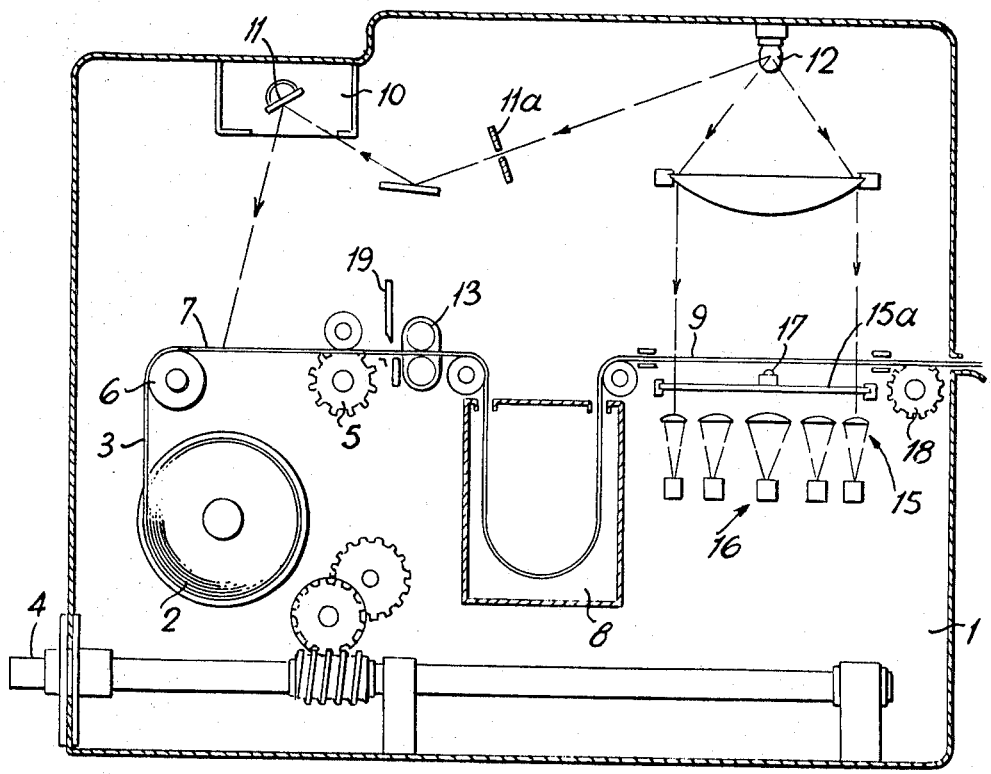
FIG. 6 is a cross section through a first embodiment of a portion of an instrument according to the present invention.
Figure 7:
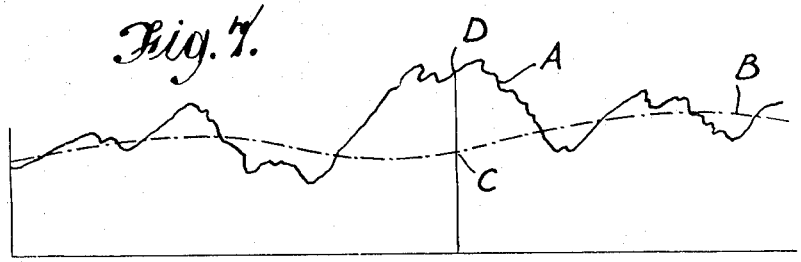
FIGS. 7 and 8 are graphs illustrating the operation of the instrument shown in FIGS. 6 and 6A.
Figure 8:
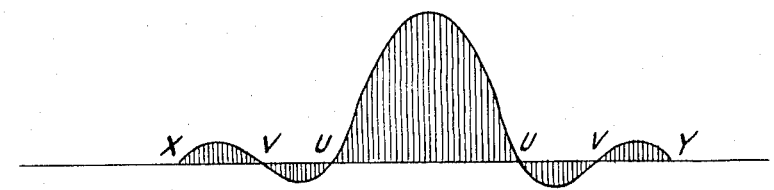

Referring to FIG. 6 of the drawings, an instrument for assessing the profile of a surface comprises a measuring device of the kind in which a stylus (not shown) is advanced over the surface of the profile which is to be assessed, and any irregularities in the surface are transmitted from the stylus to a transducer (not shown) which produces a gauge signal proportional to such irregularities. Such a gauge signal is represented by the curve A in FIG. 7. In order to evaluate a profile trace such as the curve A it is desirable to produce a reference line, with respect to which measurements may be made, and such a line is shown at B in FIG. 7. This reference line B is the locus of the point C and intersects the curve A in such a way that the areas bounded by the curve A above the line B are equal to the areas beneath the line. Such a line B may be referred to as a mean line, and is obtained by plotting a sequence of ordinates, each of which is derived as follows:

Consider the point C on the mean line B, the ordinate of which is to be determined. The point C has the same abscissa as the corresponding point D on the surface profile. It can be shown mathematically that if a finite number of ordinates of the curve A before and after the abscissa of D is taken, and the ordinates are taken for a predetermined equal distances on either side of the point D, then it is possible to calculate the ordinate of C. This is done by taking an average value of those ordinates, after weighting the ordinates in accordance with the curve shown in FIG. 8. It is desirable, but not essential to the invention that the weights given on one side are the same as those on the other side of the point D; the weights are then referred to as being symmetrical about the point D. It will be noted that as the distance away from either side of the point D increases, the weight given to the corresponding ordinate eventually decreases to nothing. In the general type of function shown in FIG. 8 there are portions between U and V where a negative weight must be given to the ordinates in order to obtain a true value of the ordinate of C, but in simpler types of function the negative portion may not arise. Beyond a certain distance the calculation ceases to have any practical effect on the point C, and that is why only the predetermined distance X–Y need be taken. It will be appreciated that if a different weighting function X–Y is used, for example a function extending between U–U or V–V, a different mean line will be obtained.

Figure 6A:
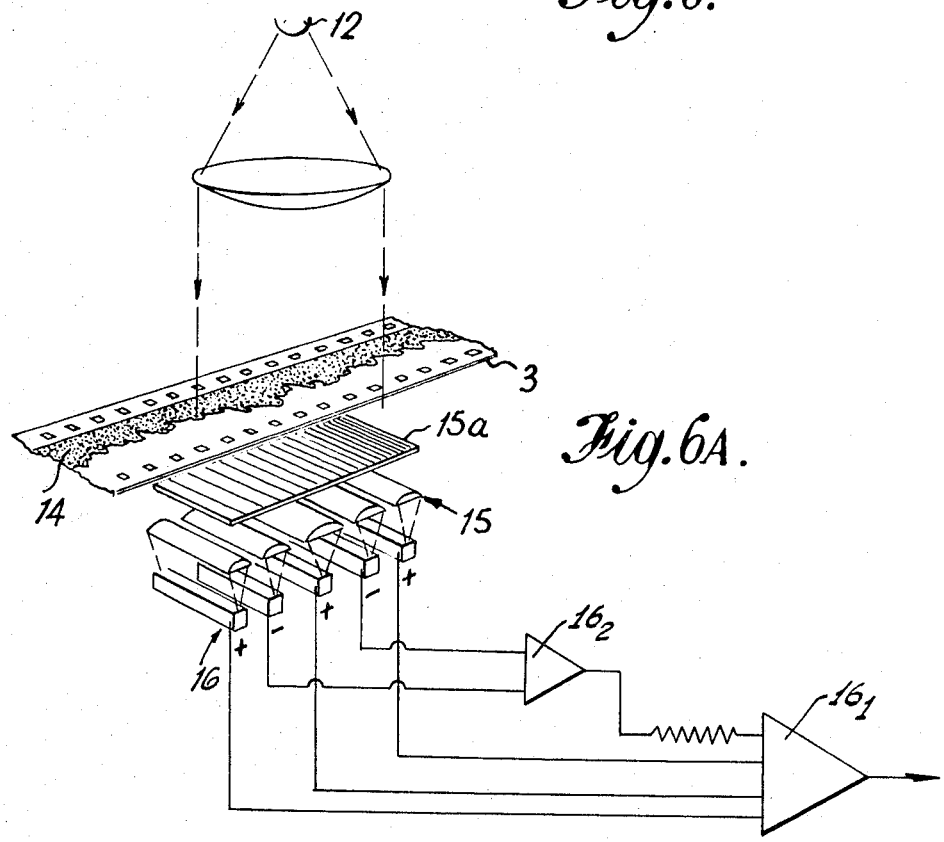
FIG. 6A is a perspective view on an enlarged scale of a part of the instrument shown in FIG. 6.

Referring now to FIGS. 6 and 6A of the accompanying drawings, the instrument comprises storage means for storing a gauge signal and then evaluating it by providing a signal by means of which a reference line of the kind described hereinbefore may be drawn. It is therefore in the nature of a computer which receives a gauge signal and provides an appropriate output.

The computer comprises a housing 1 in which is mounted a spool 2 of undeveloped film strip 3. A drive shaft 4 which may carry the stylus and transducer extends into the housing 1 and is coupled through a suitable motorized gear train, (not fully shown), with a drive sprocket 5 which serves to advance the film strip over an idler roller 6 and past a station 7 at which the gauge signal is recorded on the film 3. After passing through a processing chamber 8, the film passes through a station 9, at which the information recorded on the film is evaluated. The station 7 comprises a galvanometer 10, having a mirror 11 which is arranged to reflect light from an illuminated slit 11A onto the film strip 3. The galvanometer 10 operates in response to a gauge signal produced by the transducer. Generally the signal from the transducer will receive amplification before it is passed to the galvanometer.

The movement of the mirror 11 under the control of the galvanometer 10 records upon the undeveloped film strip a profile, eventually dark on one side and clear on the other, the contour of which corresponds to the gauge signal. The film strip 3 may be of the kind known as "Polaroid" (Registered Trade Mark) in which case it passes through a pair of squeeze rollers 13 and is then developed in the processing chamber 8 so that an opaque trace 14 is recorded thereon. One of these rollers and/or subsequent rollers may also be sprocketed to assist towing.

The information thus recorded on the film strip is now assessed at station 9 as the strip is advanced through this station. The information is assessed by deriving two signals from the film strip, the first of these signals being the convolution integral of a predetermined portion of the film strip, this being used to represent the succession of ordinates of the line B, and the second signal corresponding to the original gauge signal and being used to represent the corresponding succession of ordinates of the curve A.

In order to make the derived first signal a convolution integral, in which appropriate parts of the gauge signal are given differing weights according to their distance from the ordinate of the reference line to be determined, the light passing through the film strip is weighted by a filter 15a, of which the opacity varies along its length according to the weighting function. In the present case where there are positive and negative portions, these are separated by providing a corresponding number of cylindrical lenses 15 arranged to divide the light passing through the film strip into a number of beams, each beam falling on an individual photoelectric cell 16. The outputs of the photoelectric cells 16 are then combined positively and negatively to give the required signal, which will represent the convolution integral of the gauge signal with the weighting function represented by the filter 15a, about the midpoint of the filter 15a, occupied by the photoelectric cell 17.

The signal representing the unchanged gauge signal is derived from a single, narrow photoelectric cell 17 mounted at the axis of symmetry and in front of the lenses 15.

The outputs of the photocells 16 are passed through respective integrating amplifiers $16_1$, $16_2$ and subsequently combined, algebraically as indicated diagrammatically, to give the required convolution signal.

It will thus be seen that the film strip 3 acts to store the gauge signal so that, when the gauge signal is assessed at the station 9, each value of the convolution integral so determined takes into account the contour of the gauge signal before and after such ordinate, with a relative weight determined by the weighting function, the latter being so chosen that this convolution integral represents a mean value from which the gauge signal may be assessed mathematically.

When a complete contour trace has been recorded on the film the front edge of the strip will have reached the sprocket 18 and a cutoff knife 19 is operated to sever from the main film strip that portion on which the gauge signal has been stored, and the severed portion bearing the recorded signal is then fed past the station 9 at an appropriate speed by the sprocket 18.

The two signals taken from the photoelectric cells 16 and 17 can be used in a number of different ways. For example they can be used to draw on a recorder the curves A and B shown in FIG. 7. In another form, the integrated signal from the photocells 16 may actuate a recorder positioned to record the mean line on the strips 3 as it passed through the station 9, the pen being transparent or so shaped as to obscure a negligible portion of the light. Alternatively the algebraic sum of the two signals can be taken and integrated to give the average departure of the curve A from the reference line B. This is referred to as the CLA or centerline average, and may be indicated digitally or on a meter. Equally, other parameters (such as peak heights, bearing fractions, slopes, etc.) can be indicated.

Figure 9:
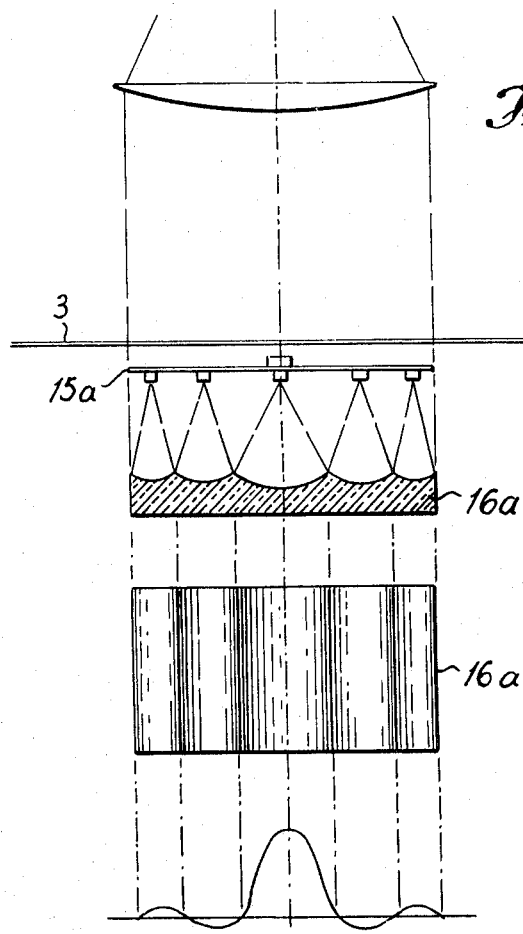
FIG. 9 is a diagrammatic elevation of a further embodiment.

FIG. 9 shows an alternative arrangement for the station 9 in the instrument of FIG. 6. The light passing through the film strips is separated into the required number of beams as determined by the number of positive and negative portions of the weighting function, by means of mirrors 16a rather than by lenses 15 as in FIGS. 6 and 6A. The photoelectric cells 16 are mounted on the opposite side of the filter strip 15a to the cell 17, but with the main contributor to the integrated signal, that is the central cell 16, close to the cell 17, which is the sole contributor to the other signal. This minimizes temperature effects on the latter two cells.

The use of a filter at the station 9 is avoided altogether in FIG. 9. The light may be directed onto a large number of cylindrical mirrors which focus the light onto an equal number of photoelectric cells. The amount of light received by any one photoelectric cell will depend on the area of its associated mirror, and by suitably arranging the relative areas of the mirrors the outputs of the cells can be used to obtain an approximation of the required weighting function, as shown in the graph in FIG. 9.

Figure 10:
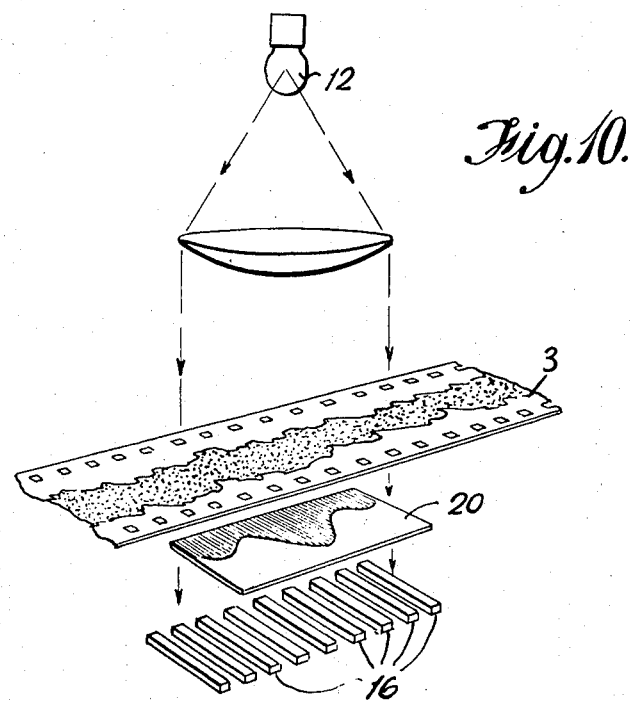
FIG. 10 is a diagrammatic perspective view of yet another embodiment.

The gauge signal can, of course, be stored in a number of different ways. For example, it could be stored on photosensitive recording paper that develops the trace by further exposure to light i.e. by solarization. Furthermore, the gauge signal could be stored on a photosensitive material in such a manner that instead of producing a contour trace on the photosensitive material, the optical density of the photosensitive material could be varied in accordance with the gauge signal. In such a case the optical means for modulating the light received by the photocells 16 might comprise a suitably-shaped mask which would block out light in accordance with the appropriate mathematical density trace, and a mask 20 for modulating light passing through such trace is shown in FIG. 10 of the accompanying drawings. In summing the electrical outputs of the photocells the nonlinearity of the optical density of the photosensitive material in relation to the amplitudes of the signals impressed thereon may be taken into account by appropriate electrical potentiometric compensating means.

It is possible that the appropriate weighting can be given to the integrated signal by weighting the output of the photoelectric cells, e.g. by resistance or potentiometric control, rather than by weighting the light received by the cells by a filter. In such a case either the outputs of the individual cells could be suitably amplified electrically or individual cells could be treated so as to alter their sensitivity. The modulation of the output of the cells can also be combined with modulation of the light received by the cells to give the required weighting.

It will be evident that the pickup (comprising the stylus and transducer) and a film unit such as is shown in FIG. 6, may be carried in the same casing or in separate casings, and coupled by mechanical means (such as gearing) or by electrical means (such as synchronous, servo, or stepper motors).

Figure 11:
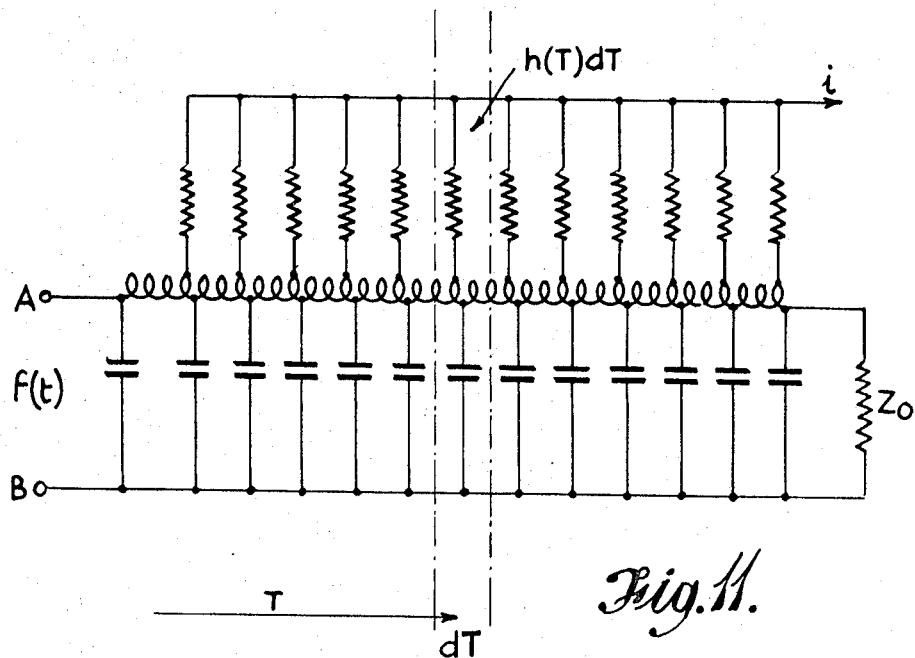
FIG. 11 is a circuit diagram of a first electrical embodiment.

Referring now to FIGS. 11 and 12 of the drawings, a further embodiment comprises an electric wave filter arranged to realize one of the weighting functions hereinbefore described. The electric wave filter replaces the photoelectric instrument of FIG. 6, the electrical gauge signal $f(t)$ from the surface sensing transducer being applied directly to the input of the filter, rather than to the galvanometer 10 of FIG. 6. If it is desired to have the filter respond according to a particular weighting function, this means that its impulse response must be the same as the weighting function. In the present case this is to be the curve 22, symmetrical about the ordinate of the point M.

FIGS. 11 and 12 show a method of achieving a symmetrical impulse response by the use of an electrical delay line. Let the response of the desired filter to a unit impulse at $t=0$ be $h(t)$. The response waveform expressed as a function of time can be obtained as follows. Assume that the gauge signal waveform $f(t)$ is composed of impulses of which a typical one occurs $T$ seconds earlier than $t$. At this time the waveform has amplitude $f(t-T)$ so that the impulse is $f(t-T)\,dT$. This impulse has a response of $f(t-T)\,dT$ multiplied by $h(T)$. Thus the total response is: $F(t) = \int f(t-T)\,h(T)\,dT$ Referring now to FIG. 11, the input wave is $f(t)$ at AB. The wave at a delay time $T$ along the delay network is $f(t-T)$. If there is placed a resistance of conductance $h(T)\,dT$ at the segment $dT$ of the delay line then the current supplied by the element $dT$ is $f(t-T)\,h(T)\,dT$. Consequently if conductances are placed along a delay line as shown in FIG. 11, so that they are proportioned according to the impulse response of a desired filter characteristic the summed output current $i$ will provide this characteristic. To provide a perfect filter characteristic, the delay line should have a perfect characteristic, an infinite number of taps and be of infinite length, but a good approximation to an ideal response can be obtained practically with a finite number of taps. Care must of course be taken that the conductances are much less than the characteristic impedance of the delay network.

Figure 13:
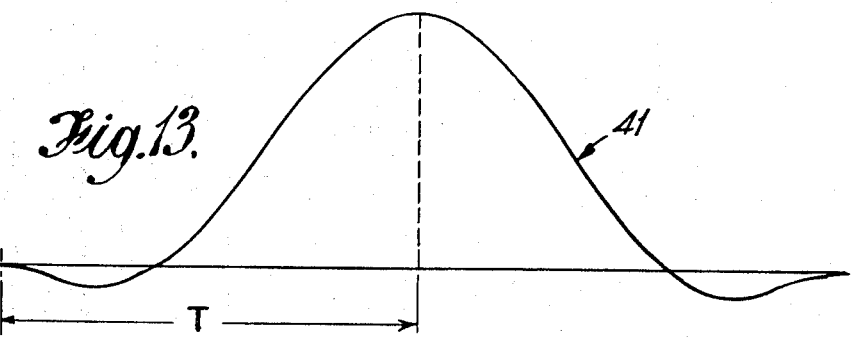
FIGS. 13 and 14 are diagrammatic representations of a further electrical embodiment and its operation.
Figure 14:
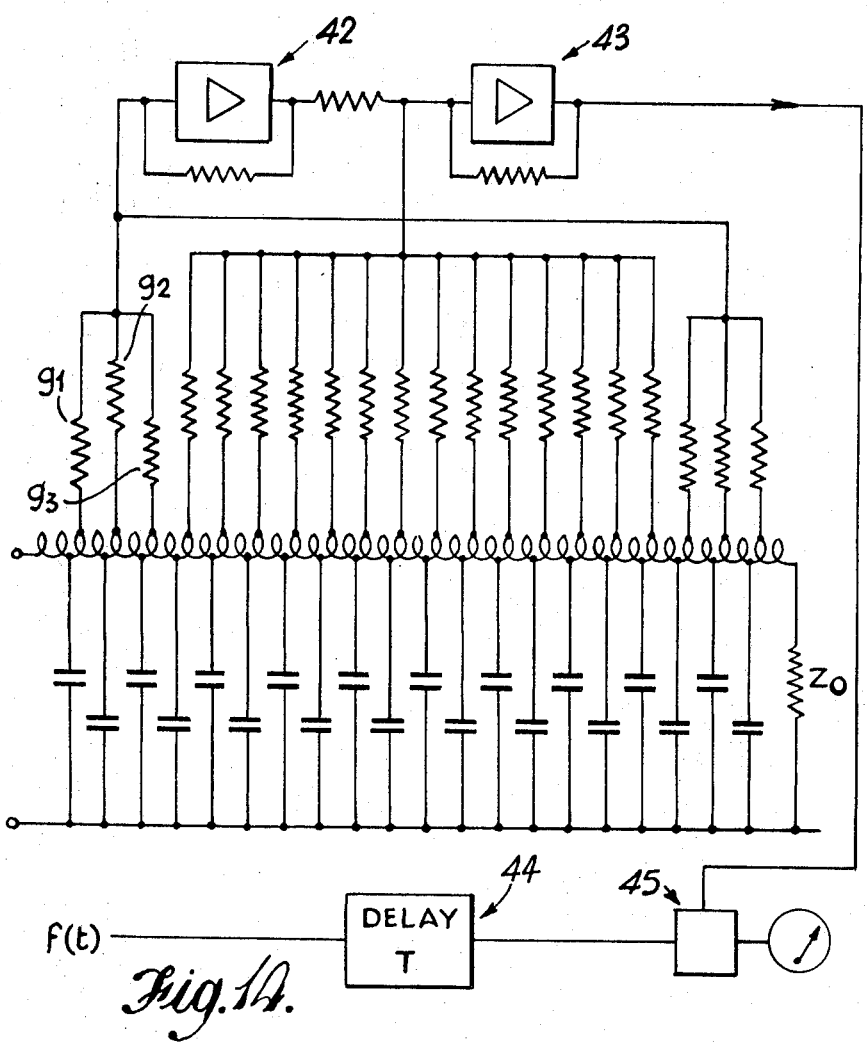

FIG. 14 shows an embodiment of a delay line arranged to produce a desired filter response. The desired impulse response is shown as the curve 41, (FIG. 13) which contains negative ordinates. To produce this characteristic the conductances $g_1$ $g_2$ $g_3$ etc. are chosen proportional to the ordinates of the desired impulse response, but, in order to allow for the negative ordinates, reversing amplifier 42 and summing amplifier 43 are added. The output from the amplifier 43 is $f(t)$ modified by a filter with a symmetrical impulse response. If the desired impulse response has duration $2T$ as shown in FIG. 13, then the delay line must have a total delay time of $2T$. The output of amplifier 43 is then the reference for the profile $f(t-AY)$. Now $f(t-T)$ exists at the centerpoint of the delay network, so that it might be thought that measurement might be made directly by comparing the output of 43 with the signal at the centerpoint of the delay network. In practice this would require that the delay network was capable of transmitting the whole of the band of frequencies contained in $f(t)$ which would require a much more expensive and complex line than is necessary for the filtering function alone. It is therefore preferable as shown in FIG. 14 to introduce a separate time delay 44, which can for instance take the form of recording $f(t)$ on a moving magnetic tape and reproducing it $T$ seconds later from a reproducing head. The outputs from 43 and 44 can then be combined in 45 to give a measure of surface finish according to the invention.

Where, as in this invention, the weighting function (FIG. 13), is symmetrical, the delay line may be open circuited, and reflection from the open circuit may provide the second half of the required response.

FIG. 15 is a representation in diagrammatic form of another embodiment of the present invention using electromagnetic signal storage means to provide the desired symmetrical filter impulse response and signal delay. In FIG. 15, 50 is a belt coated with amorphous selenium or other photoconductive substance which is arranged to move at a speed S. A lamp 51, condensing lens 52, slit 53, imaging lens 54 are arranged to cast a bright slit of light across belt 50, through a transparent electrode 55. 55 is fed with the signal $f(t)$. Apart from the beam of light generated as stated above the apparatus is kept in darkness. When the light strikes the photoconductive surface charge carriers are formed, and the surface underneath the transparent electrode charges to a voltage determined by the electrode spacing and proportional to the applied voltage $f(t)$. Consequently as the photoconductive surface moves away from the electrode it carries a charge pattern proportional to the values of $f(t)$ across its whole width. 56, 57, 58, 59 are electrodes forming the sensing elements for electrometer amplifiers, and spaced off from the belt, 56 and 57 are electrodes shaped according to the negative portions of the desired filter impulse response, and 58 an electrode shaped according to the positive portion of the desired filter impulse response. 56 and 57 are joined and feed one electrometer amplifier and 58 feeds a second amplifier. The outputs from these amplifiers are subtracted and the output from the subtracting circuit represents the value of the reference potential—equivalent to the output of 43 in FIG. 14. The electrode 59 (which is very narrow in the direction of travel of the belt) picks up a voltage proportional to $f(t-T)$. Surface finish measurements according to the invention can be made by measuring the difference between the voltages A and B, because the difference between the potentials picked up by electrodes 58 and 56, 57 is the original signal $f(t)$ operated upon by a filter with a symmetrical impulse response, and the potential picked up by electrode 59 is the original signal delayed in time so as to coincide with the peak of the filter impulse characteristic.

The gauge signal can alternatively be stored in a magnetic storage medium, such as, for example, magnetic tape. An embodiment employing magnetic tape storage is shown in diagrammatic form in FIG. 15A, the arrangement being similar to that of FIG. 15 employing electrostatic storage. In FIG. 15A a flexible tape 70 having a surface coating of magnetic material is fed at a constant speed S (by conventional means, not shown) past a recording station 71 and a reading station 72 successively.

A recording head 73 is located at the recording station 71, and head 73 having a narrow surface extending transversely across the entire width of the tape 70 adjacent the coated surface thereof. The gauge signal $f(t)$ is recorded on the tape 70 as a modulation of a high frequency signal of a predetermined frequency generated by an oscillator 74. Thus the gauge signal $f(t)$ is stored by distribution in space along the surface of the tape 70, the magnetization of the coating across the whole width of the tape varying in the direction of movement of the tape in accordance with the function $f(t)$.

Reading heads 76, 77, 78, 79 are disposed in juxtaposition to the coated surface of the tape 79 at the reading station 72 and detect the magnetically recorded signal on the tape as the tape passes the heads. The magnitude of the signal picked up from any narrow transversely extending strip of the tape 70 beneath a head is dependent on the area of that strip covered by the head. Each head 76, 77, 78 extends only partially across the tape 70, the transverse width of each head varying along the length of the head in accordance with the desired filter impulse response, that is, in accordance with the required weighting function for the gauge signals. Analogously with the embodiment of FIG. 15 the profiles of the reading heads 76 and 77 are shaped to conform with the shapes of the negative portions of the desired impulse response, and the reading head 78 is shaped to conform with the shape of the positive portion of the impulse response. The heads 76, 77, 78 are connected to respective demodulators $76^1$, $77^1$, $78^1$, the outputs from the demodulators $76^1$, $77^1$ being interconnected and fed to an amplifier 80 while the output from the demodulator $78^1$ is fed to an amplifier 81.

The outputs from the amplifiers 80, 81 are subtracted in a subtracting circuit 82, the output from which is the instantaneous value of the convolution integral, equivalent to the output of the summing amplifier 43 in FIG. 14. The head 79 is of very small extent in the direction of movement of the tape, and is spaced a distance ST from the recording head 73. A respective demodulator $79^1$ is connected to the head 79, and the output of the demodulator $79^1$, which is proportional to $f(t-T)$, is passed through an amplifier 83 to a comparator circuit 84 where this output is compared with the output of the subtracting circuit 82 to give a surface finish measurement, which is conveniently indicated by a meter 85. The maximum width of the reading head 78, corresponding to the peak of the impulse response curve, coincides with the position of the reading head 79. In the embodiment of FIG. 15A the recording station 71 corresponds to the recording station including the galvanometer 10 in the photoelectric embodiment of FIG. 6, and the reading heads 76—79 and associated circuiting correspond to the assessing station 9 of FIG. 6 and the photocells 16, 17 with their associated circuits.

The gauge signal may alternatively be stored magnetically on a rotary drum provided with a magnetic surface coating, the recording and reading stations being spaced around the circumference of the drum. In general any magnetic medium may be used to store the gauge signals, relative movement being effected between the magnetic medium and the recording and reading heads.

The gauge signals stored in the magnetic medium may be weighted in accordance with the prescribed weighting function by other methods than that illustrated in FIG. 15A. For example, the reading station 72 may be provided with a reading head extending in the direction of movement S and provided with a number of conductors or pickup coils spaced at equal intervals along the length of the reading head. The external circuit connected to the reading head is such that the signals received by the respective conductors or pickup coils are weighted relatively in accordance with the prescribed weighting function. Alternatively, or in addition, the spacing of the conductors or pickup coils along the length of the reading head may be proportioned in accordance with the prescribed weighting function. These methods of weighting the output of the reading head are particularly applicable where the magnetic storage medium does not have any appreciable width, for example where the medium comprises a magnetizable wire. In general the weighting is effected by varying the effective sensitivity of the reading head or heads along the direction of movement of the magnetic medium, either electrically, by means of external circuits, or geometrically, by the shape and/or positioning of the reading head or heads, or by a combination of these techniques.

In the embodiment of FIG. 14 the desired filtering characteristic is obtained by sampling $f(t)$, which has been distributed in time by means of an electrical delay network, whilst in the embodiments of FIGS. 15 and 15A the characteristic is obtained by distributing the signal in space along the surface of the belt or the magnetic medium and then sampling. In the embodiment of FIG. 14 the frequency characteristic of the realized filter, and in particular its cutoff frequency, (i.e. the signal frequency at which the output signal drops to 6 db. below its maximum response), is determined by the delay time of the delay line and is fixed. In the embodiments of FIGS. 15 and 15A the frequency characteristic of the filter can be modified as desired by controlling the speed of the photoconductive belt or of the magnetic medium.

FIG. 16 shows a further embodiment of the present invention adapted for the measurement of roundness. When a stylus mounted in an accurate spindle feels around the surface of a nominally round part the output signal will normally contain frequencies at the rotation frequency and its harmonics. The component at the rotation frequency represents the eccentricity (or the displacement between the axis of the spindle and the nominal center of the part) whilst the harmonic frequencies represent departure from a perfectly round form. In order to measure these departures it is necessary to eliminate the fundamental component due to eccentricity, and without introducing objectionable relative phase shifts between the harmonics.

In FIG. 16, 61 is a spindle carrying a stylus and transducer 62 which is feeling around a nominally round part 63. The transducer output $f(t)$ is fed into a delay network with tappings, substantially of the form shown in FIG. 14 so that the output of amplifier 64 is $f(t)$ passed through a filter with a symmetrical impulse response. The desired amplitude response of the filter is shown as 65 where there is no attenuation at the rotation angular frequency $wr$ and infinite attenuation at twice this frequency and beyond, and where the attenuation falloff is sinusoidal.

The impulse response corresponding to this desired amplitude characteristic can be shown to be:

$$L(t) = \frac{w_1}{\pi} \frac{\sin w_1 t}{w_1 t} \frac{\cos wr_2}{1 - \frac{(wrt)^2}{\pi}} \text{ where } w_1 = \frac{3wr}{2}$$

This impulse response has zero's at $\pm n/3fr$ where $fr$ is the rotation frequency (i.e. $wr/2\pi$). If the time delay of the electrical delay network is made equal to the time taken by the stylus to complete two revolutions, and the conductances $g_1$ $g_2$ $g_3$ etc. made properly proportional to the ordinates of the impulse response above, the output at 64 will be $f(t)$ passed through a filter with the amplitude characteristic 65, and with linear phase shift. Moreover, since the time-delay of the delay line is the time taken for two complete revolutions of the stylus, and the signal $f(t)$ is recurrent at each revolution, the departure from perfect roundness of the part can be directly measured by comparing $f(t)$ with the output at 64 in 66.

The output at 64 is a direct measure of the eccentricity between the spindle 61 and the part 63. It is worth noting that in FIG. 16 the delay line has been drawn with three sets of conductances leading to the positive ordinate amplifier and two sets to the negative ordinate amplifier. This is because in the application of FIG. 16 the delay line covers three zeros on each side of the peak of the symmetrical impulse response.

It will be appreciated that an instrument according to the present invention provides an integrating computer which is simple and accurate, and obviates the need for long tedious calculations on data relating to the surface profiles of workpieces.

We claim:

1. An instrument for the assessment of profiles, especially the profiles of surface irregularities, the instrument comprising in combination: transducer means for producing from a profile a first signal proportional to the amplitude of the irregularities of said profile relative to a convenient datum, signal means defining a weighting function for any given instantaneous value of the first signal, which weighting storage means for storing said first signal, and means responsive to the storage means and to said weighting function signal means for deriving from said stored first signal a second signal representing at any instant the value of the convolution integral of a predetermined portion of the stored first signal with said weighting function, said second signal representing a mean profile from which the first signal is assessed.

2. An instrument as claimed in claim 1, wherein said second signal representing the mean profile is combined with a signal representing the actual profile, for direct numerical assessment of surface profile.

3. An instrument as claimed in claim 2, and including means for taking the algebraic sum of said two signals.

4. An instrument as claimed in claim 1, in which said storage means comprise means for recording the first signal on an information receptive material.

5. An instrument as claimed in claim 4, in which the means for deriving said second signal include a light source for scanning the material bearing the stored first signal, and photoelectric means responsive to light transmitted through said material.

6. An instrument as claimed in claim 5 wherein the signal means defining the weighting function comprises optical means for modulating the light received by said photoelectric means so as to give the appropriate weighting to the signal obtained from said photoelectric means.

7. An instrument as claimed in claim 6, in which said photoelectric means comprise a number of photoelectric cells, said optical means being arranged to divide the light to be received by said cells into a number of beams, each of which strikes an individual photoelectric cell.

8. An instrument as claimed in claim 7, in which said optical means comprise a number of cylindrical lenses each arranged to focus light emerging from a selected part of said photosensitive material onto an individual photoelectric cell.

9. An instrument as claimed in claim 7, in which certain of said photoelectric cells are arranged so that their output signals oppose the output signals of the remaining cells.

10. An instrument as claimed in claim 4, in which said storage means record the first signal on a photosensitive material.

11. An instrument as claimed in claim 10, in which said material is a film strip.

12. An instrument as claimed in claim 11, in which the film strip is Polaroid film.

13. An instrument as claimed in claim 11, and including means for processing said film strip when the said first signal has been recorded thereon.

14. An instrument as claimed in claim 4, wherein said material is a photosensitive material and the means for recording the first signal comprise a movable mirror, forming part of a galvanometer means operating in response to said first signal, the said mirror being arranged to reflect light onto said photosensitive material.

15. An instrument as claimed in claim 1, wherein said second signal is recorded for superposition on a graph representing the original profile.

16. An instrument as claimed in claim 1, wherein said storage means comprise an electrical delay network for storing said first signal representative of said irregularities, thereby deliberately delaying said signal for a predetermined time.

17. An instrument as claimed in claim 16, wherein said electrical delay network comprises resistances proportioned inversely with respect to the amplitude of the desired weighting function for forming said convolution integral.

18. An instrument as claimed in claim 16, wherein said weighting function is symmetrical, and said delay network is in the form of a delay line which is open circuited, whereby the reflection from said open circuit provides the second half of the required response.

19. An instrument as claimed in claim 1, wherein said storage means comprise an insulated surface on which charge densities represent said first signal.

20. An instrument as claimed in claim 16, wherein said means for deriving a signal representing the desired convolution integral comprise an electrode forming the plate of an electrometer and shaped in the form of the weighting function of said convolution integral.

21. An instrument as claimed in claim 1, in which the storage means comprise a magnetic storage medium effective to store said first signal and at least one reading head in juxtaposition to the storage medium for reading the stored first signal therefrom.

22. An instrument as claimed in claim 21, wherein said at least one reading head includes conductors wound thereon and evenly spaced along the length of said reading head, whereby the signals received by the conductors are weighted relatively in accordance with a prescribed weighting function.

23. An instrument as claimed in claim 21, wherein said at least one reading head includes conductors wound thereon, the spacing of said conductors being proportioned in accordance with a prescribed weighting function.

24. An instrument as claimed in claim 21, including driving means for effecting relative movement between the magnetic medium and said at least one reading head at a predetermined rate, and wherein the effective sensitivity of said at least one reading head is varied along its length in the direction of said relative movement in accordance with a prescribed weighting function.

25. An instrument as claimed in claim 24, wherein the effective width of the said at least one reading head varies in a direction transverse to said direction of relative movement to vary the effective sensitivity of the reading head along said direction of relative movement.

26. An instrument as claimed in claim 21, including an oscillator producing a signal, a recording head effective to record said signal in the magnetic storage medium, and modulator means modulating said signal by means of the first signal.

27. An instrument as claimed in claim 21, wherein the magnetic storage medium comprises a drum having a magnetizable surface, driving means being provided for effecting relative rotation between the drum and the said at least one reading head.

28. An instrument as claimed in claim 21, wherein the magnetic storage medium comprises a magnetic tape, driving means being provided for effecting linear movement of the tape past the said at least one reading head.

29. An instrument for the assessment of profile, especially the profiles of surface irregularity, the instrument comprising in combination: transducer means for producing from a profile a first signal proportional to the amplitude of the irregularities of said profile relative to a convenient datum, signal filtering storage means for receiving the said first signal, said signal filtering storage means having a symmetrical impulse response, and means deriving from the filtering storage means a second signal representing at any instant the value of the convolution integral of a predetermined portion of the first signal with a weighting function conforming to said impulse response, said second signal representing a mean profile from which the first signal is assessed.

30. An instrument as claimed in claim 29 in which the signal filtering storage means comprise an electric wave filter.

31. An instrument as claimed in claim 29 in which the signal filtering storage means comprise an electrical delay network.